(12) United States Patent
Ashida et al.

(10) Patent No.: US 9,372,868 B2
(45) Date of Patent: Jun. 21, 2016

(54) EFFICIENCY OF FILE SYNCHRONIZATION IN A LINEAR TAPE FILE SYSTEM

(71) Applicant: International Business Machines Corporation, Armonk, NY (US)

(72) Inventors: Takashi Ashida, Yamato (JP); Tohru Hasegawa, Tokyo (JP); Hiroshi Itagaki, Yokohama (JP); Shinsuke Mitsuma, Tokyo (JP); Terue Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 14/096,094

(22) Filed: Dec. 4, 2013

(65) Prior Publication Data

US 2015/0154222 A1     Jun. 4, 2015

(51) Int. Cl.
G06F 7/00       (2006.01)
G06F 17/00     (2006.01)
G06F 17/30     (2006.01)

(52) U.S. Cl.
CPC ............... G06F 17/30174 (2013.01)

(58) Field of Classification Search
CPC ..... G06F 3/0686; G06F 3/0643; G06F 3/061; G06F 3/0656; G06F 3/0682
USPC ........................................................ 707/610
See application file for complete search history.

(56) References Cited

U.S. PATENT DOCUMENTS

| | | | | |
|---|---|---|---|---|
| 6,587,298 B1 * | 7/2003 | Yamada | ............. | G11B 20/10 360/72.1 |
| 7,920,599 B1 * | 4/2011 | Subramanian | .... | H04W 56/0085 370/292 |
| 8,601,209 B1 * | 12/2013 | LeCrone | ............. | G06F 11/2094 711/111 |
| 2009/0030983 A1 * | 1/2009 | Malaiyandi | ......... | G06F 11/1076 709/204 |
| 2010/0199042 A1 * | 8/2010 | Bates | .................... | H04L 67/289 711/114 |
| 2011/0066593 A1 * | 3/2011 | Ahluwalia | ........ | G06F 17/30312 707/624 |
| 2011/0238716 A1 * | 9/2011 | Amir | ..................... | G06F 3/0611 707/823 |

(Continued)

OTHER PUBLICATIONS

Rasch, David, "In-Place Rsync: File Synchronization for Mobile and Wireless Devices", Proceedings of the FREENIX Track: 2003 USENIX Annual Technical Conference, San Antonio, Texas, http://www.it.iitb.ac.in/arndg/dokuwiki/images/temp/1/1f/20130530154120!phpZg7My0.pdf, Jun. 9-14, 2003, 10 pages.

(Continued)

*Primary Examiner* — Baoquoc N To
*Assistant Examiner* — Nicholas Allen
(74) *Attorney, Agent, or Firm* — Francis Lammes; Stephen J. Walder, Jr.; Randall J. Bluestone

(57) ABSTRACT

A mechanism is provided for improved file synchronization of a magnetic tape. A destination device determines whether one or more file checksums exist in an extended file attribute associated with an identified file. Responsive to one or more file checksums existing in the extended file attribute associated with the identified file, the destination device reads the one or more file checksums out of the extended file attribute without accessing the magnetic tape. The destination device transmits the one or more file checksums to a source device. The source device segments the data of the new file into fixed-length blocks that do not overlap one another. The source device calculates one or more new file checksums for each of the fixed-length blocks. The source device transmits the one or more new file checksums to the destination device.

20 Claims, 6 Drawing Sheets

(56) References Cited

U.S. PATENT DOCUMENTS

| | | | | |
|---|---|---|---|---|
| 2011/0238906 A1* | 9/2011 | Amir | ............... | G06F 3/0611 |
| | | | | 711/111 |
| 2011/0239097 A1* | 9/2011 | Bates | ............... | G06F 11/1004 |
| | | | | 714/807 |
| 2012/0078931 A1* | 3/2012 | Jaquette | ............... | H04N 21/2181 |
| | | | | 707/758 |
| 2012/0079184 A1* | 3/2012 | Jaquette | ............... | G06F 3/0611 |
| | | | | 711/111 |
| 2012/0158760 A1* | 6/2012 | Borden | ............... | G06F 17/30097 |
| | | | | 707/758 |
| 2012/0179867 A1* | 7/2012 | Chakravarty | ............... | G06F 17/30858 |
| | | | | 711/111 |
| 2012/0192175 A1* | 7/2012 | Dorai | ............... | G06F 9/45558 |
| | | | | 718/1 |
| 2012/0317079 A1* | 12/2012 | Shoens | ............... | G06F 17/30215 |
| | | | | 707/639 |
| 2013/0110778 A1* | 5/2013 | Taylor | ............... | G06F 17/30215 |
| | | | | 707/624 |
| 2013/0138607 A1* | 5/2013 | Bashyam | ............... | G06F 17/30174 |
| | | | | 707/610 |
| 2013/0243190 A1* | 9/2013 | Yang | ............... | H04L 9/0816 |
| | | | | 380/44 |
| 2013/0262758 A1* | 10/2013 | Smith | ............... | G06F 3/0605 |
| | | | | 711/112 |
| 2013/0305057 A1* | 11/2013 | Greco | ............... | G06F 21/80 |
| | | | | 713/189 |

OTHER PUBLICATIONS

Tridgell, Andrew et al., "The rsync algorithm", Department of Computer Science, Australian National University, Canberra, Australia, Nov. 9, 1998, retrieved May 22, 2013, 11 pages.

* cited by examiner

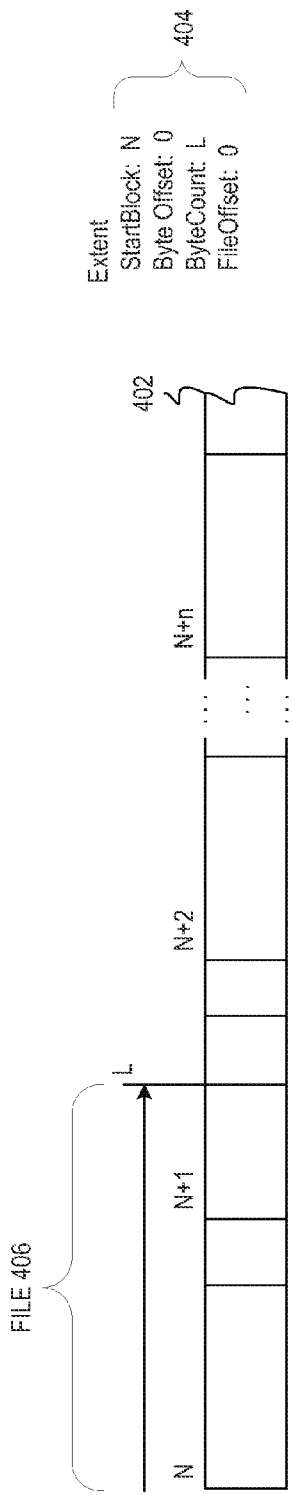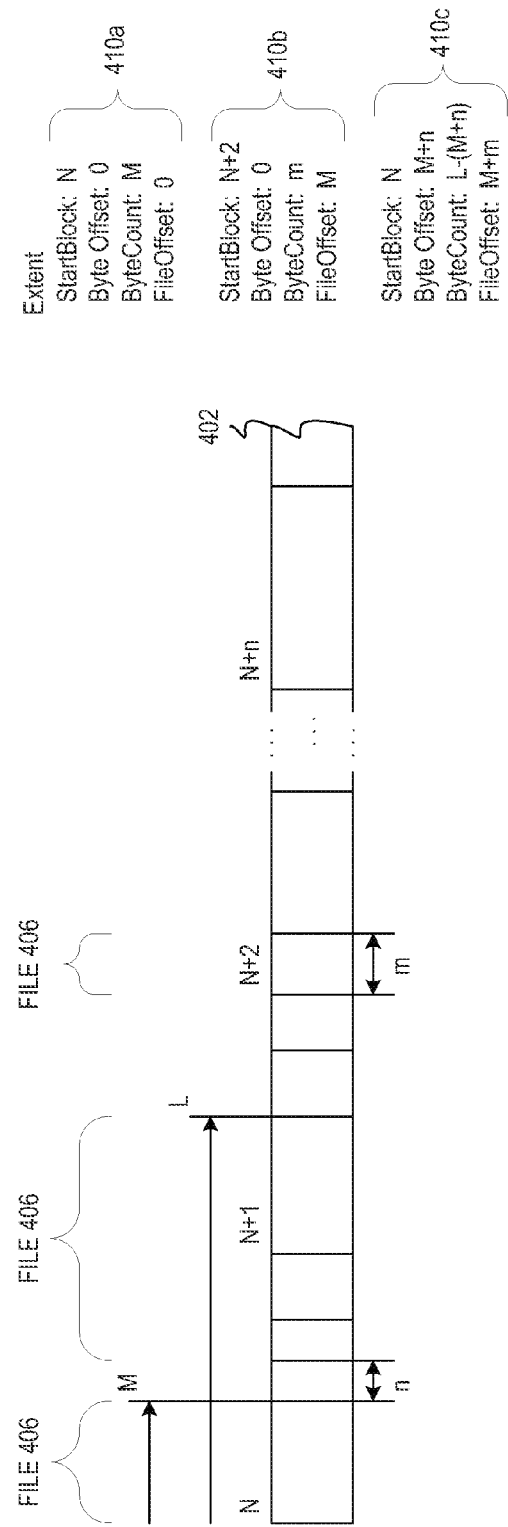
FIG. 4A
FIG. 4B

EFFICIENCY OF FILE SYNCHRONIZATION IN A LINEAR TAPE FILE SYSTEM

BACKGROUND

The present application relates generally to an improved data processing apparatus and method and more specifically to mechanisms for improving the efficiency of file synchronization in a linear tape file system.

Linear Tape File System (LTFS) refers to both the format of data recorded on magnetic tape media and the implementation of specific software that uses this data format to provide a file system interface to data stored on magnetic tape. The Linear Tape File System format is a self-describing tape format developed by International Business Machines (IBM) Corporation of Armonk, N.Y. to address tape archive requirements. The LTFS Format specification defines the organization of data and metadata on tape, where the files are stored in a hierarchical directory structure. Data tapes written in the LTFS Format can be used independently of any external database or storage system allowing direct access to file content data and file metadata. This format makes it possible to implement software that presents a standard file system view of the data stored in the tape media. This file system view makes accessing files stored on the LTFS formatted media similar to accessing files stored on other forms of storage media such as disk or removable flash drives.

As mentioned above, in LTFS, in addition to the storing of the content of a file itself into a tape medium, metadata that relates to the file that is stored. This metadata may include data referred to as an index, such as a Universally Unique Identifier (UUID) used for identifying the file, the name of the file, etc., is stored into the tape medium, such as in an Extendible Markup Language (XML) format. In the existing LTFS Format, it is not permitted to divide an index into a plurality of XML files. The task of storing an index on the tape medium is referred to as a "sync" task or operation. A user can select the timing of the execution of the sync operation by configuring the settings at the time of the startup of the LTFS system. Examples of the timing of the execution of a sync operation include periodical execution, execution at the time of the closing of a file, and execution at the time of the unmounting, or dismounting, of a tape medium.

SUMMARY

In one illustrative embodiment, a method, in a data processing system, is provided for improved file synchronization of a magnetic tape. The illustrative embodiment determines, by a destination device, whether one or more file checksums exist in an extended file attribute associated with an identified file. In the illustrative embodiment the extended file attribute of the identified file in an index associated with the magnetic tape and the index is in a local data structure associated with the destination device. The illustrative embodiment reads, by the destination device, the one or more file checksums out of the extended file attribute without accessing the magnetic tape in response to one or more file checksums existing in the extended file attribute associated with the identified file. The illustrative embodiment transmits, by the destination device, the one or more file checksums to a source device. The illustrative embodiment segments, by the source device, the data of the new file into fixed-length blocks that do not overlap one another. The illustrative embodiment calculates, by the source device, one or more new file checksums for each of the fixed-length blocks. The illustrative embodiment transmits, by the source device, the one or more new file checksums to the destination device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 4A and 4B provide an exemplary illustration of the unnecessary need for a temporary file using the above provided extents in accordance with an illustrative embodiment.

DETAILED DESCRIPTION

Again, a linear ape file system (LTFS) makes accessing files stored on a LTFS formatted media similar to accessing files stored on other forms of storage media such as disk or removable flash drives. Therefore, with the advent of LTFS it is possible to apply conventional technology for file synchronization between remote places to magnetic tape devices. This type of file synchronization between remote places makes it possible to synchronize files with a smaller amount of communication by transferring only differences between files. This difference-based synchronization technique produces effects not only in file transfer between remote places via a low-rate communication channel hut also in file transfer between remote places via a high-rate communication channel for which a fee may be charged depending on the amount of data transferred, for example, as in cloud services. Although LTFS may be used as the destination system of file synchronization in the current state of art, current LTFS file synchronization mechanisms comprise both rate efficiency and capacity efficiency issues. That is, current LTFS file synchronization mechanisms require a read data on a magnetic tape for the purpose of extracting file differences therefrom, which is time consuming because of an occurrence of tape seeking. Current file synchronization mechanisms further require some amount of time to apply the difference to the file on the magnetic tape because of the occurrence of seek and, despite the fact that differences have been extracted, the entire file is written into the magnetic tape, which necessitates wasteful consumption of tape capacity.

Thus, the illustrative embodiments provide mechanisms for improving the efficiency of file synchronization in a linear tape file system by reducing tape reading and tape writing to a requisite minimum. The mechanisms pre-store information that is necessary for the extraction of differences in an LTFS area called an "index". The mechanisms store the content of the index in a high-speed cache, such as a memory, at the time of magnetic tape mounting and write this index out onto a magnetic tape at the time of magnetic tape unmounting or dismounting. For this reason, the mechanisms do not require accessing data on the magnetic tape at the time of the extraction of the differences. Further, the mechanisms perform processing, on a file-system level, by applying only the difference data to the file on the magnetic tape. The mechanisms provide an interface that allows an arbitrary part of a file to be overwritten.

Figure 1:
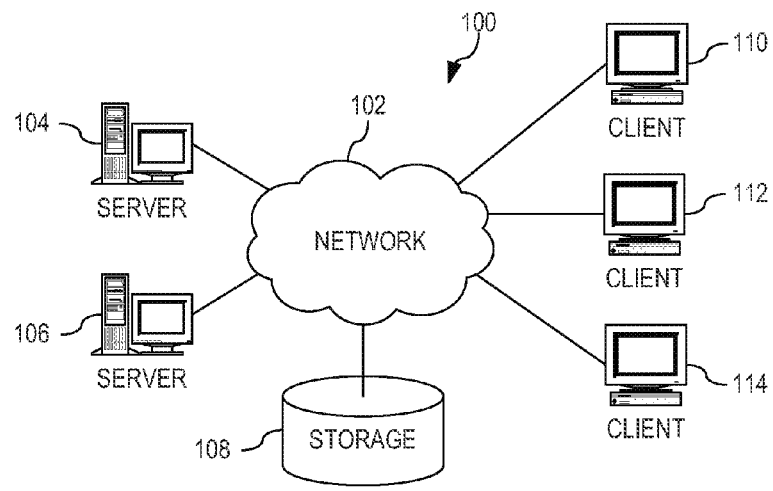
FIG. 1 is an example diagram of a distributed data processing system in which aspects of the illustrative embodiments may be implemented.
Figure 2:
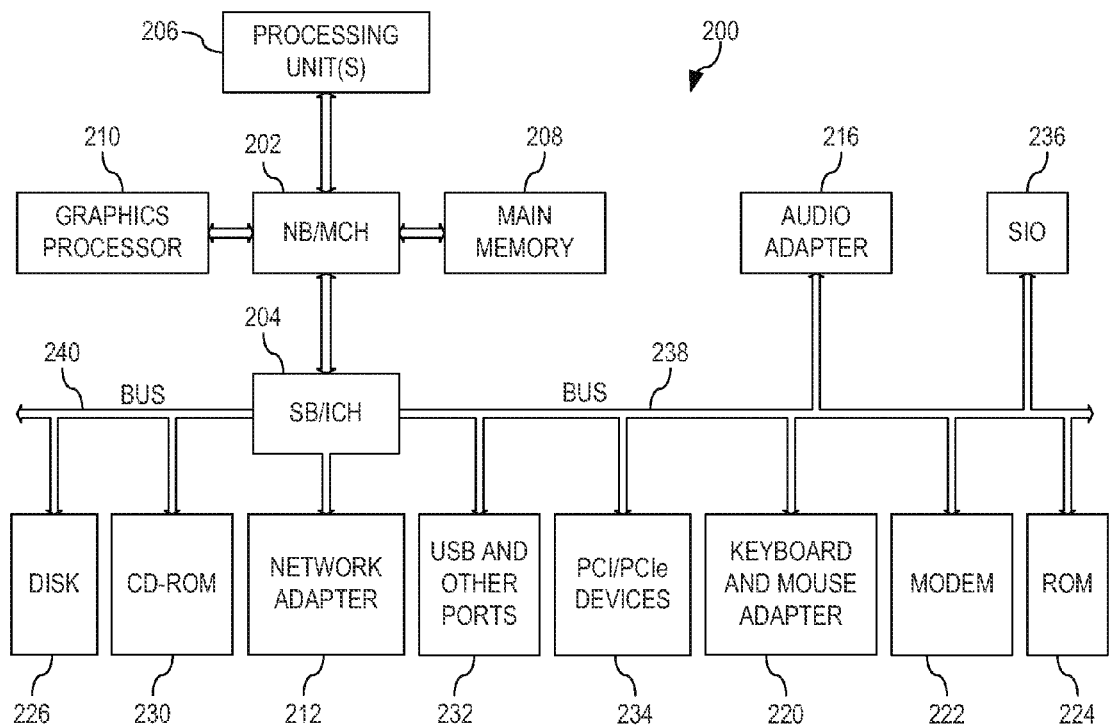
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, white PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Currently, when a linear tape file system (LTFS) is performing a file synchronization between a source device, i.e. the device that is attempting to access a file on a magnetic tape, which is hereinafter referred to simply as tape, and a destination device, i.e. the device that reads the file on the tape, the LTFS performs the file synchronization using, for example, an "rsync" operation, which is a technique for file synchronization between remote locations. While the host device and destination device are normally two separate data processing systems, in some instances, the source device may be the same data processing system as the destination device, for example, where a local backup is performed. When the LTFS executes the rsync operation, the destination device segments a target file into fixed-length blocks that do not overlap one another and calculates a checksum for each of these blocks. The destination device then transmits the result of this calculation to the source device. The source device performs a fixed-length-block checksum calculation of a new file while sequentially shifting offset by one from the head (the beginning), while sequentially generating overlaps between contiguous blocks for the file. Then, the source device determines whether the result of this calculation agrees with any of the received checksums or not.

If the source device determines that the result of the calculation does not agree with any of the received checksums, the source device transmits a "literal" instruction for each disagreement to the destination device. On the other hand, if the source device determines that the result of the calculation agrees with a received checksums, the source device transmits a "reference-position" instruction of the received checksum, i.e. the position of the block in the local file of the transfer destination before synchronization. Regarding the literal instruction, the destination device copies the received literal data into a temporary file. Regarding the reference-position instruction, the destination device copies the corresponding block data contained in the local file of the transfer destination into the temporary file. After the completion of the processing of all instructions, the transfer-destination host overwrites the local file of the transfer destination with the content of the temporary file.

However, the file synchronization of the current system has numerous issues that delay tape reading and tape writing, such as:

When reading data, the data has to be read from the tape for the purpose of performing checksum calculation, which takes additional time due to the occurrence of seeking the tape to find the file associated with the read.

When a block data is to be copied, there is an additional operation that reads the data on the tape, which also takes additional time due to the occurrence of seeking the tape.

When a changed file is to be written back to the tape, since LTFS is a write-once-type file system, the entire file has to be written back to the tape in a different location, which means wasteful consumption of tape capacity.

When creating the temporary file that identifies the changes to the file to be written, additional space has to be secured on a device other than the tape for the temporary file.

In order to solve these issues, the mechanisms of the illustrative embodiments reduce accesses to the tape to a requisite minimum. After initial file synchronization, the source device transmits checksums that have been subjected to synchronization to the destination device. The destination device stores the received checksums as extended file attributes to the index of the tape. By storing the received checksums as extended attributes, it is unnecessary to access the data on the tape for the checksum transmission when the mechanisms perform each subsequent file synchronization for that file, which results in reducing the delay of reading from the tape for the purpose of performing checksum calculation. The content of the index is stored in a high-speed data structure of the destination device, such as a cache memory, at the time of mounting and written out onto the tape at the time of dismounting the tape.

Additionally, the mechanisms of the illustrative embodiments are configured so that the destination device processes received instructions on a file-system level. That is, in a copy operation where an arbitrary part of a file is overwritten with data having an arbitrary size, the mechanisms process, for example, a reference-position instruction just by rewriting information called an "extent," which is stored in the index, which results in reducing the delay of reading from the tape. Regarding the literal instruction, the mechanisms rewrite the extent information and write only the literal data. This elevates the necessity to write the entire file back to the tape in a different location. Finally, since the data on the tape is updated directly, the temporary file is not necessary.

Figure 3:
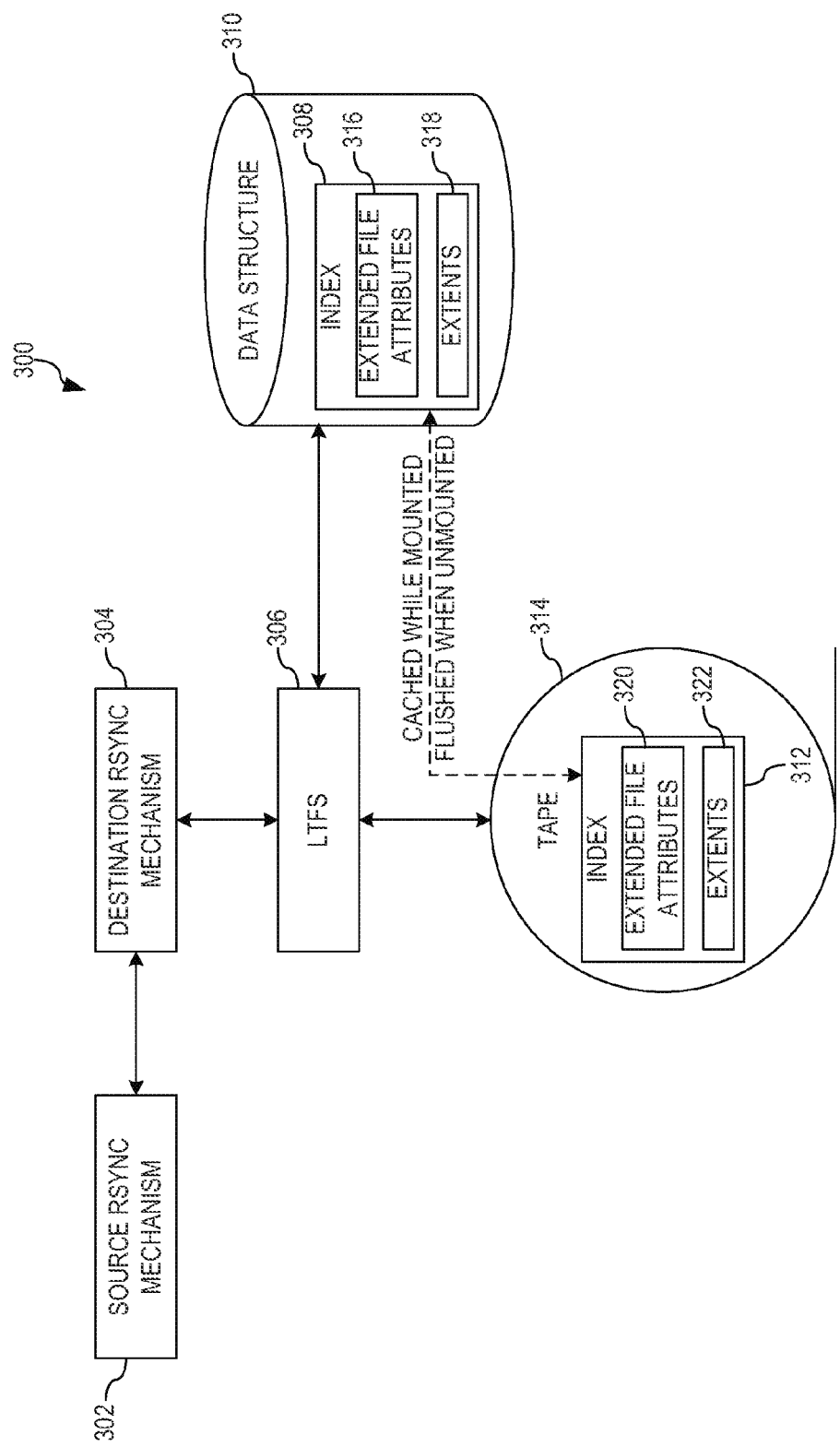
FIG. 3 depicts a functional block diagram of an improved file synchronization mechanism that improves the efficiency of file synchronization in a linear tape file system by reducing tape reading and tape writing to a requisite minimum in accordance with an illustrative embodiment.

FIG. 3 depicts a functional block diagram of an improved file synchronization mechanism that improves the efficiency of file synchronization in a linear tape file system by reducing tape reading and tape writing to a requisite minimum in accordance with an illustrative embodiment. While the following example is performed using an "rsync" mechanism that is executed on both a source device and a destination device in conjunction with a linear tape file system (LTFS) executing on the destination device, one of ordinary skill in the art would recognize that the mechanisms of the illustrative embodiment may utilize any synchronization mechanism that synchronizes a file on a source device with a file on a tape via a destination device to achieve the improved efficiency.

Thus, data processing system 300 comprises source rsync mechanism 302, destination rsync mechanism 304, and LTFS 306. As source rsync mechanism 302 initially requests destination rsync mechanism 304 for checksums of all fixed-length blocks of a designated file on tape 314, destination rsync mechanism 304 determines whether there are checksums in extended file attributes 316 stored in index 308 associated with the file. With index 308 available, if there are no checksum stored in extended file attributes 316, destination rsync mechanism 304 reads out all of the data of the file from tape 314 in order to perform the checksum calculations, segments the file into fixed-length blocks that do not overlap one another, and calculates a checksum for each of these blocks. Destination rsync mechanism 304 transmits the checksums to source rsync mechanism 302. If destination rsync mechanism 304 determines that there are checksums in extended file attributes 316 of index 308 associated with the file in local data structure 310, destination rsync mechanism 304 reads the designated file checksum out of extended file attributes 316 associated with the identification of the file in index 308 of local data structure 310. Destination rsync mechanism 304 transmits the checksums to source rsync mechanism 302.

Upon receiving the checksums, source rsync mechanism 302 sets a value of an offset variable and a value of a disagree_length variable to 0. Source rsync mechanism 302 determines whether a sum of a value of the offset variable, a value of the disagree_length variable, and a predefined value of the block_length, which is a length of fixed-length-block to calculate checksum, is less than or equal to the size of the new file. If source rsync mechanism 302 determines that the sum of the value of the offset variable, the value of the disagree_length variable, and the value of the block_length is less than or equal to the size of the new file, source rsync mechanism 302 calculates a checksum of the fixed-length block starting from a sum of the value of the offset and the value of the disagree_length in the new file. Source rsync mechanism 302 may store the calculated checksum for later transmission for blocks where the sum of the value of the offset variable and the value of the disagree_length in the new file is a multiple of the value of the block_length variable. Source rsync mechanism 302 then determines whether the calculated checksum agrees with one of the checksums received from destination rsync mechanism 304. If source rsync mechanism 302 determines that the calculated checksum fails to agree with any one of the checksums received from destination rsync mechanism 304, source rsync mechanism 302 increases the value of the disagree_length variable by 1.

If source rsync mechanism 302 determines that the calculated checksum agrees with one of the checksums received from destination rsync mechanism 304, source rsync mechanism 302 transmits the data equivalent to the value of the disagree_length variable starting from the value of the offset variable as a literal instruction to destination rsync mechanism 304. Source rsync mechanism 302 only transmits the literal instruction to destination rsync mechanism 304 when the size of the literal data (i.e. the value of the disagree_length variable) is greater than zero. When destination rsync mechanism 304 receives the literal instruction and associated data, destination rsync mechanism 304 writes the received data to tape 314 and updates extents 318 in index 308 of local data structure 310 associated with destination rsync mechanism 304. Source rsync mechanism 302 then sets the value of the offset variable equal to a sum of the previous value of the offset variable and the value of the disagree_length variable and sets the value of the disagree_length variable to 0. Source rsync mechanism 302 then transmits a reference-position instruction to destination rsync mechanism 304. Destination rsync mechanism 304 updates extents 318 in index 308 of local data structure 310 and source rsync mechanism 302 sets the value of the offset variable equal to a sum of the previous value of the offset variable and the value of the block_length.

If source rsync mechanism 302 determines that the sum of the value of the offset variable, the value of the disagree_length variable, and the value of the block_length is greater than the size of the new file, then source rsync mechanism 302 transmits the data equivalent to the difference of the size of the new file minus the offset from the offset as a literal instruction to destination rsync mechanism 304. Transmission of a literal instruction or a reference-position instruction from source rsync mechanism 302 to destination rsync mechanism 304 instructs LTFS 306 to process the write on a file-system level. That is, LTFS 306 manages information on the positions of file data on tape 314 as a set of extents 318 stored in index 308 which is eventually written to index 312 when unmounting tape 314. Thus, LTFS 306 provides destination rsync mechanism 304 the functions to write to the one or more existing extents 318 or add the one or more new extents 318. One extent of the set of extents 318 represents one consecutive area on the tape and has the following attribute:

StartBlock: The record number on the tape at which the data is stored.
ByteOffset: Offset for a data start in the record.
ByteCount: Data length.
FileOffset: Position inside the file.

Again, source rsync mechanism 302 only transmits the literal instruction to destination rsync mechanism 304 when the size of the literal data is greater than zero. When destination rsync mechanism 304 receives the literal instruction and associated data, destination rsync mechanism 304 writes the received data to tape 314 and updates extents 318 in index 308 of local data structure 310.

Source rsync mechanism 302 segments the new file into fixed-length blocks that do not overlap one another and calculates a checksum for each of these blocks. Source rsync mechanism 302 may recalculate the checksums or use the already calculated checksums. Source rsync mechanism 302 then transmits the result of the checksum calculations to destination rsync mechanism 304. Destination rsync mechanism 304 then stores the received checksums into extended file attributes 316 associated with the designated file in index 308 of local data structure 310.

Because of this extent scheme, LTFS 306 efficiently performs the operation of overwriting an arbitrary part of a file with data having an arbitrary size. That is, LTFS 306 rewrites the extent information in the index 308 and only writes the literal data to tape 314. With regard to a reference-position instruction, LTFS 306 merely rewrites the extent information stored inside index 308 since there is no change to the actual file data. When LTFS 306 is requested to dismount tape 314, prior to dismounting tape 314, LTFS 306 writes the changes made to extended file attributes 316 and extents 318 in index 308 to extended file attributes 320 and extents 322 in index 312 on tape 314, then dismounts tape 314.

FIGS. 4A and 4B provide an exemplary illustration of the unnecessary need for a temporary file using the above provided extents in accordance with an illustrative embodiment. In FIG. 4A, tape 402 is divided into blocks N, N+1, N+2, . . . , through N+n. As is illustrated by extent 404, file 406 written to tape 402 starts at block N, has no byte offset, has a byte count of L, and has no file offset. In FIG. 4B, tape 402 is divided into blocks N, N+1, N+2, . . . , through N+n. However, file 406 has been modified such that, when the changes of file 406 are written to tape 402, file 406 is now represented by three extents: 410a, 410b, and 410c. As is illustrated by extent 410a, file 406 written to the tape starts at block N, has no byte offset, and has no file offset. However, due to the change in file 406, the byte count has been changed from L to M. From that point, extent 410b causes the next read to jump to start block N+2, with no byte offset, for a byte count of m, and with a file offset of M due to the previous read, which indicates that it is appended to the previous read of M. Extent 410b picks up the portion of file 406 that has changed and written to block N+2. Finally, extent 410c causes the final read to jump to start block N, with byte offset of M+n, for a byte count of L−(M+n), and with a file offset of M+m due to the previous read, which indicates that it is appended to the previous read of M+m.

Thus, by supporting synchronization processing on a file-system level, the illustrative embodiments utilize a scheme that allows for efficiently performing the operation of overwriting an arbitrary part of a file with data having an arbitrary size. That is, source rsync mechanism, destination rsync mechanism, and LTFS working in the above specified manner provide an advantageous scheme that performs data-overwrite processing at the place of data change through the use of extended file attributes and extents. By utilizing the extended file attributes and extents as specified previously, the overall efficiency of file synchronization in a linear tape file system is improved by reducing tape reading and tape writing to a requisite minimum.

The above aspects and advantages of the illustrative embodiments of the present invention will be described in greater detail hereafter with reference to the accompanying figures, it should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5A:
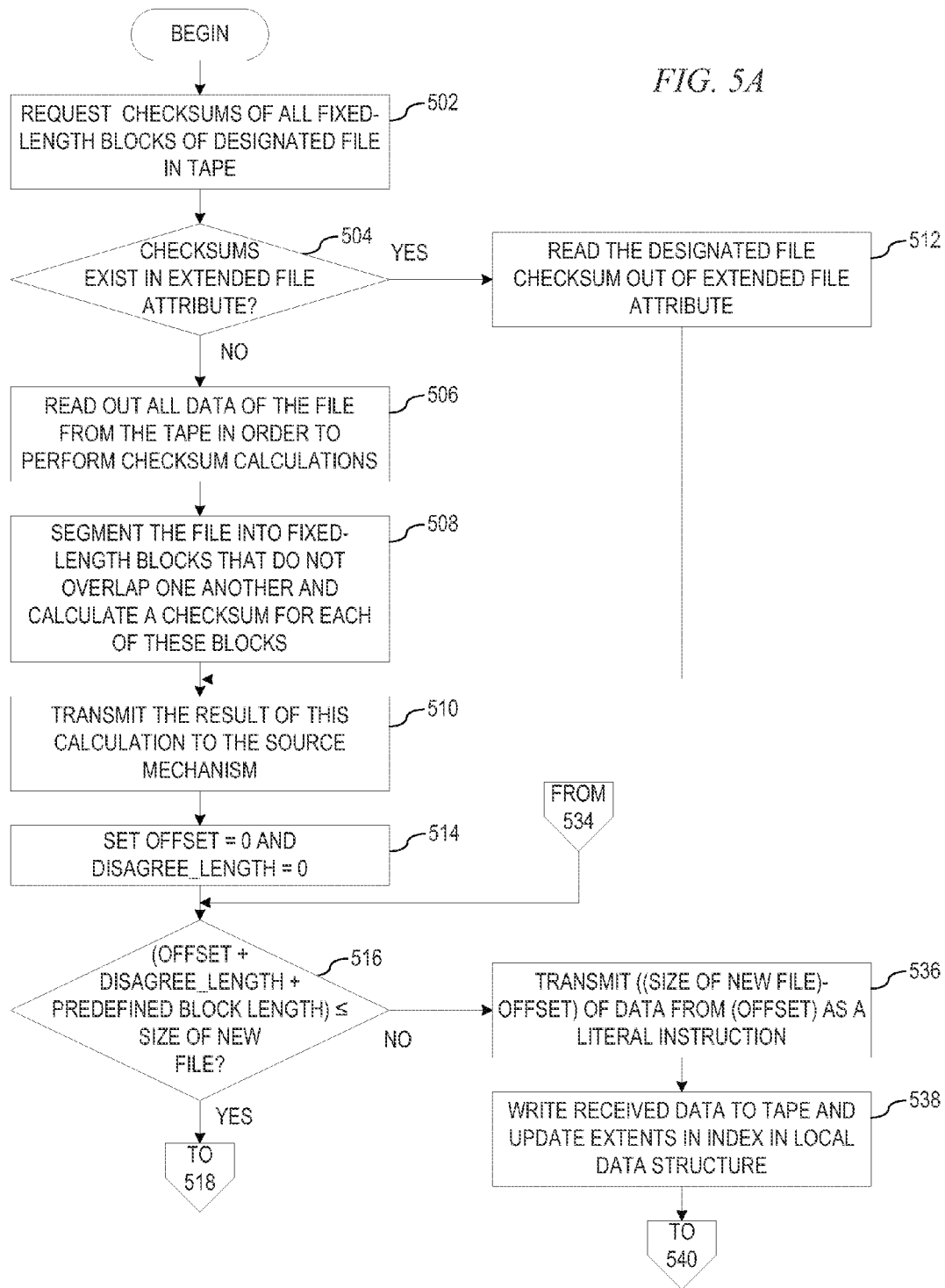
FIGS. 5A-5C depict the operation of an improved file synchronization mechanism in accordance with an illustrative embodiment.
Figure 5B:
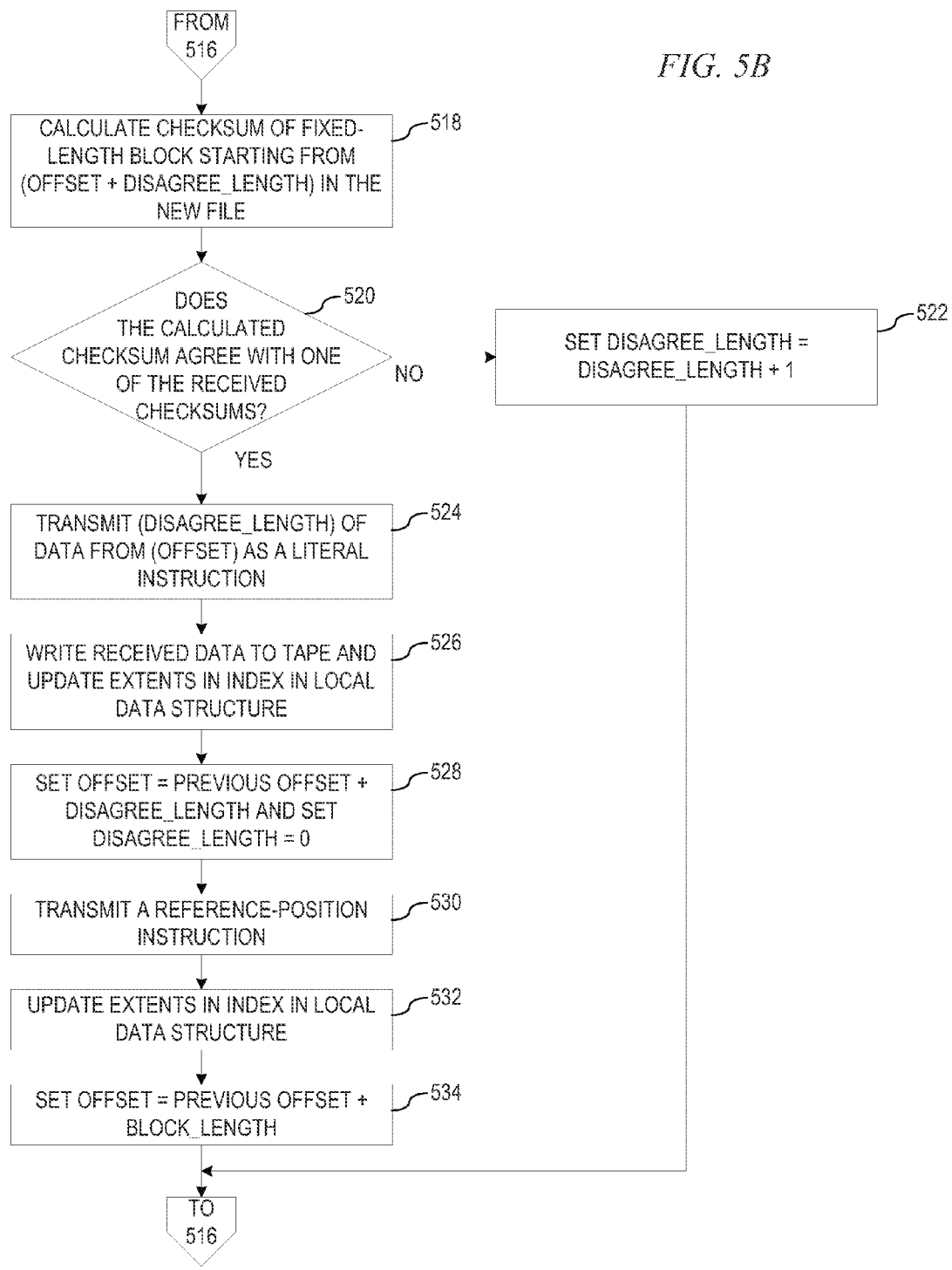
Figure 5C:
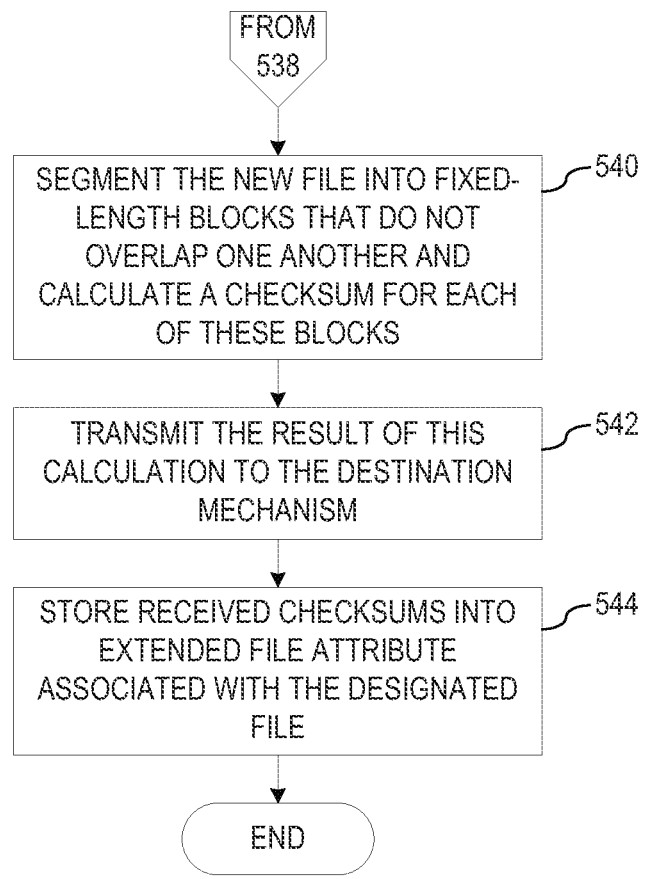

FIGS. 5A-5C depict the operation of an improved file synchronization mechanism in accordance with an illustrative embodiment. As the operation begins, a source mechanism requests checksums of all fixed-length blocks of a designated file on the tape from a destination mechanism (step 502). Responsive to the request for the checksums of all fixed-length blocks of a designated file on the tape, the destination mechanism determines whether the checksums exist in the extended file attribute associated with the identification of the file in the index of the local data structure (step 504). If at step 504 there are not any checksums in the extended file attribute, the destination mechanism reads out all of the data of the file from the tape in order to perform the checksum calculations (step 506). The destination mechanism segments the file into fixed-length blocks that do not overlap one another and calculates a checksum for each of these blocks (step 508). The destination mechanism then transmits the result of the checksum calculations to the source mechanism (step 510). If at step 504 the destination mechanism determines that there are checksums in an extended file attribute of the index, the destination mechanism reads the designated file checksum out of extended file attribute associated with the identification of the file in the index of the local data structure (step 512), with the operation proceeding to step 510 thereafter.

From step 510, the source mechanism sets a value of an offset variable and a value of a disagree_length variable to 0 (step 514). The source mechanism then determines whether a sum of a value of the offset variable, a value of the disagree_length variable, and a predefined value of the block_length, which is length of fixed-length-block to calculate checksum, is less than or equal to the size of the new file (step 516). If at step 516 the source mechanism determines that the sum of the value of the offset variable, the value of the disagree_length variable, and the value of the block_length is less than or equal to the size of the new file, the source mechanism calculates a checksum of the fixed-length block starting from a sum of the value of the offset and the value of the disagree_length in the new file (step 518). The source mechanism may store the calculated checksum for later transmission for blocks where the sum of the value of the offset variable and the value of the disagree_length in the new file is a multiple of the value of the block_length variable. The source mechanism then determines whether the calculated checksum agrees with one of the checksums received from the destination mechanism (step 520). If at step 520 the source mechanism determines that the calculated checksum fails to agrees with any one of the checksums received from the destination mechanism, the source mechanism increases the value of the disagree_length variable by 1 (step 522), with the operation returning to step 516 thereafter.

If at step 520 the source mechanism determines that the calculated checksum agrees with one of the checksums received from the destination mechanism, the source mechanism transmits the data equivalent to the value of the disagree_ length variable starting from the value of the offset variable as a literal instruction to the destination mechanism (step 524). The literal instruction is only transmitted to the destination mechanism when the size of the literal data (i.e. the value of the disagree_length variable) is greater than zero. When the destination mechanism receives the literal instruction and associated data, the destination mechanism writes the received data to the tape and updates the extents in the index of the local data structure associated with the destination mechanism (step 526). The source mechanism then sets the value of the offset variable equal to a sum of the previous value of the offset variable and the value of the disagree_ length variable and sets the value of the disagree_length variable to 0 (step 528). The source mechanism then transmits a reference-position instruction to the destination mechanism (step 530). The destination mechanism updates the extents in the index of the local data structure associated with the destination mechanism (step 532) and the source mechanism sets the value of the offset variable equal to a sum of the previous value of the offset variable and the value of the block_length (step 534), with the operation returning to step 516 thereafter.

If at step 516 the source mechanism determines that the sum of the value of the offset variable, the value of the disagree_length variable, and the value of the block_length is greater than the size of the new file, then the source mechanism transmits the data equivalent to the difference of the size of the new file minus the offset from the offset as a literal instruction to the destination mechanism (step 536). Again, the literal instruction is only transmitted to the destination mechanism when the size of the literal data is greater than zero. When the destination mechanism receives the literal instruction and associated data, the destination mechanism writes the received data to the tape and updates the extents in the index of the local data structure associated with the destination mechanism (step 538).

From step 538, the source mechanism segments the new file into fixed-length blocks that do not overlap one another and calculates a checksum for each of these blocks (step 540). The source mechanism may recalculate the checksums or the source mechanism may use the checksums already calculated from step 518. The source mechanism then transmits the result of the checksum calculations to the destination mechanism (step 542). The destination mechanism then stores the received checksums into the extended file attribute associated with the designated file in the index of the local data structure associated with the destination mechanism (step 544) with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for improving the efficiency of file synchronization in a linear tape file system by reducing tape reading and tape writing to a requisite minimum. The mechanisms pre-store information that is necessary for the extraction of differences in an LTFS area called an "index". The mechanisms store the content of the index in a high-speed cache, such as a memory, at the time of tape mounting and write this index out onto a tape at the time of tape unmounting or dismounting. For this reason, the mechanisms do not require accessing data on the tape at the time of the extraction of the differences. Further, the mechanisms perform processing, on a file-system level, by applying only the difference data to the file on the tape. The mechanisms provide an interface that allows an arbitrary part of a file to be overwritten.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for improved file synchronization of a magnetic tape, the method comprising:
    determining, by a destination device, whether one or more file checksums exist in an extended file attribute associated with an identified file, wherein the extended file attribute of the identified file is in an index associated with the magnetic tape and wherein the index is in a local data structure associated with the destination device;
    responsive to one or more file checksums existing in the extended file attribute associated with the identified file, reading, by the destination device, the one or more file checksums out of the extended file attribute without accessing the magnetic tape;
    transmitting, by the destination device, the one or more file checksums to a source device;
    upon receiving the one or more file checksums, setting, by the source device, a value of an offset variable and a value of a disagree_length variable to 0;
    determining, by the source device, whether a sum of the value of the offset variable, the value of the disagree_length variable, and a predefined value of a block_length is less than or equal to a size of a modified version of the identified file thereby forming a new file, wherein the predefined value of the block_length is a length of a fixed-length block to calculate checksum;
    responsive to the determining that the sum of the value of the offset variable, the value of the disagree_length variable, and the predefined value of the block_length is greater than the size of the new file, transmitting, by the source device, the data equivalent to the difference of the size of the new file minus the offset from the value of the offset as a literal instruction to the destination device;
    segmenting, by the source device, data of the new file into fixed-length blocks that do not overlap one another;
    calculating, by the source device, one or more new file checksums for each of the fixed-length blocks;
    transmitting, by the source device, the one or more new file checksums to the destination device; and
    storing, by the destination device, the one or more new file checksums in the extended file attributes associated with the new file in the index associated with the magnetic tape in the local data structure.

2. The method of claim 1, further comprising:
    updating, by the destination device, one or more existing extents or adding, by the destination device, one or more new extents, wherein the one or more existing extents and the one or more new extents are in the index in the local data structure associated with the destination device; and
    writing, by the destination device, to the magnetic tape utilizing the updated one or more existing extents or the one or more new extents.

3. The method of claim 2, wherein functions to update the one or more existing extents or add the one or more new extents is provided by a linear tape file system.

4. The method of claim 1, further comprising:
    responsive to the one or more file checksums failing to exist in the extended file attribute associated with the file in the index in the local data structure associated with the destination device, reading out, by the destination device, all data of the file from the magnetic tape;
    segmenting, by a destination device, the data of the file from the magnetic tape into fixed-length blocks that do not overlap one another;
    calculating, by the destination device, one or more file checksums for each of the fixed-length blocks; and transmitting, by the destination device, the one or more new checksums to the source device.

5. The method of claim 1, further comprising:
storing, by the destination device, the one or more new file checksums received from the source device in the extended file attribute as associated with the file in the index in the local data structure associated with the destination device.

6. The method of claim 1, further comprising:
responsive to an indication to dismount the magnetic tape, writing, by a linear tape file system, contents of the index from the local data structure to an index on the magnetic tape.

7. The method of claim 6, wherein the linear tape file system writes to the magnetic tape at a file-system level.

8. A computer program product comprising a computer readable storage medium having a computer readable program stored therein, wherein the computer readable program, when executed on a computing device, causes the computing device to:
determine, by a destination device, whether one or more file checksums exist in an extended file attribute associated with an identified file, wherein the extended file attribute of the identified file is in an index associated with the magnetic tape and wherein the index is in a local data structure associated with the destination device;
responsive to one or more file checksums existing in the extended file attribute associated with the identified file, read, by the destination device, the one or more file checksums out of the extended file attribute without accessing the magnetic tape;
transmit, by the destination device, the one or more file checksums to a source device;
upon receiving the one or more file checksums, setting, by the source device, a value of an offset variable and a value of a disagree_length variable to 0;
determining, by the source device, whether a sum of the value of the offset variable, the value of the disagree_length variable, and a predefined value of a block_length is less than or equal to a size of a modified version of the identified file thereby forming a new file, wherein the predefined value of the block_length is a length of a fixed-length block to calculate checksum;
responsive to the determining that the sum of the value of the offset variable, the value of the disagree_length variable, and the predefined value of the block_length is greater than the size of the new file, transmitting, by the source device, the data equivalent to the difference of the size of the new file minus the offset from the value of the offset as a literal instruction to the destination device;
segment, by the source device, data of the new file into fixed-length blocks that do not overlap one another;
calculate, by the source device, one or more new file checksums for each of the fixed-length blocks;
transmit, by the source device, the one or more new file checksums to the destination device; and
storing, by the destination device, the one or more new file checksums in the extended file attributes associated with the new file in the index associated with the magnetic tape in the local data structure.

9. The computer program product of claim 8, wherein the computer readable program further causes the computing device to:
update, by the destination device, one or more existing extents or add, by the destination device, one or more new extents, wherein the one or more existing extents and the one or more new extents are in the index in the local data structure associated with the destination device; and
write, by the destination device, to the magnetic tape utilizing the updated one or more existing extents or the one or more new extents.

10. The computer program product of claim 9, wherein functions to update the one or more existing extents or add the one or more new extents is provided by a linear tape file system.

11. The computer program product of claim 8, wherein the computer readable program further causes the computing device to:
responsive to the one or more file checksums failing to exist in the extended file attribute associated with the file in the index in the local data structure associated with the destination device, read out, by the destination device, all data of the file from the magnetic tape;
segment, by a destination device, the data of the file from the magnetic tape into fixed-length blocks that do not overlap one another;
calculate, by the destination device, one or more file checksums for each of the fixed-length blocks; and
transmit, by the destination device, the one or more new checksums to the source device.

12. The computer program product of claim 8, wherein the computer readable program further causes the computing device to:
store, by the destination device, the one or more new file checksums received from the source device in the extended file attribute as associated with the file in the index in the local data structure associated with the destination device.

13. The computer program product of claim 8, wherein the computer readable program further causes the computing device to:
responsive to an indication to dismount the magnetic tape, write, by a linear tape file system, contents of the index from the local data structure to an index on the magnetic tape.

14. The computer program product of claim 13, wherein the linear tape file system writes to the magnetic tape at a file-system level.

15. An apparatus comprising:
a destination device and a source device, wherein each of the destination device and the source device comprise:
a processor; and
a memory coupled to the processor,
wherein the memories comprise instructions which, when executed by the processors, cause the processors to:
determine, by the destination device, whether one or more file checksums exist in an extended file attribute associated with an identified file, wherein the extended file attribute of the identified file is in an index associated with the magnetic tape and wherein the index is in a local data structure associated with the destination device;
responsive to one or more file checksums existing in the extended file attribute associated with the identified file, read, by the destination device, the one or more file checksums out of the extended file attribute without accessing the magnetic tape;
transmit, by the destination device, the one or more file checksums to the source device;
upon receiving the one or more file checksums, setting, by the source device, a value of an offset variable and a value of a disagree_length variable to 0;

determining, by the source device, whether a sum of the value of the offset variable, the value of the disagree_length variable, and a predefined value of a block_length is less than or equal to a size of a modified version of the identified file thereby forming a new file, wherein the predefined value of the block_length is a length of a fixed-length block to calculate checksum;

responsive to the determining that the sum of the value of the offset variable, the value of the disagree_length variable, and the predefined value of the block_length is greater than the size of the new file, transmitting, by the source device, the data equivalent to the difference of the size of the new file minus the offset from the value of the offset as a literal instruction to the destination device;

segmenting, by the source device, data of the new file into fixed-length blocks that do not overlap one another;

calculating, by the source device, one or more new file checksums for each of the fixed-length blocks;

transmitting, by the source device, the one or more new file checksums to the destination device; and storing, by the destination device, the one or more new file checksums in the extended file attributes associated with the new file in the index associated with the magnetic tape in the local data structure.

16. The apparatus of claim 15, wherein the instructions further cause the processors to:

update, by the destination device, one or more existing extents or add, by the destination device, one or more new extents, wherein the one or more existing extents and the one or more new extents are in the index in the local data structure associated with the destination device; and write, by the destination device, to the magnetic tape utilizing the updated one or more existing extents or the one or more new extents.

17. The apparatus of claim 16, wherein functions to update the one or more existing extents or add the one or more new extents is provided by a linear tape file system.

18. The apparatus of claim 15, wherein the instructions further cause the processors to:

responsive to the one or more file checksums failing to exist in the extended file attribute associated with the file in the index in the local data structure associated with the destination device, read out, by the destination device, all data of the file from the magnetic tape;

segment, by a destination device, the data of the file from the magnetic tape into fixed-length blocks that do not overlap one another;

calculate, by the destination device, one or more file checksums for each of the fixed-length blocks; and transmit, by the destination device, the one or more new checksums to the source device.

19. The apparatus of claim 15, wherein the instructions further cause the processors to:

store, by the destination device, the one or more new file checksums received from the source device in the extended file attribute as associated with the file in the index in the local data structure associated with the destination device.

20. The apparatus of claim 15, wherein the instructions further cause the processors to:

responsive to an indication to dismount the magnetic tape, write, by a linear tape file system, contents of the index from the local data structure to an index on the magnetic tape, wherein the linear tape file system writes to the magnetic tape at a file-system level.

* * * * *